(12) United States Patent
Ranbom et al.

(10) Patent No.: US 9,644,089 B2
(45) Date of Patent: May 9, 2017

(54) METHODS FOR CROSSLINKING POLYMER COMPOSITIONS IN THE PRESENCE OF ATMOSPHERIC OXYGEN

(71) Applicant: Arkema Inc., King of Prussia, PA (US)

(72) Inventors: Wayne Ranbom, Hopewell, NJ (US); Leonard H. Palys, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/772,796

(22) PCT Filed: Feb. 28, 2014

(86) PCT No.: PCT/US2014/019194
§ 371 (c)(1),
(2) Date: Sep. 4, 2015

(87) PCT Pub. No.: WO2014/158665
PCT Pub. Date: Oct. 2, 2014

(65) Prior Publication Data
US 2016/0017135 A1    Jan. 21, 2016

Related U.S. Application Data

(60) Provisional application No. 61/782,055, filed on Mar. 14, 2013.

(51) Int. Cl.
| | |
|---|---|
| C08L 23/00 | (2006.01) |
| C08L 23/30 | (2006.01) |
| C08J 3/24 | (2006.01) |
| B29C 45/00 | (2006.01) |
| B29C 47/00 | (2006.01) |
| B29K 23/00 | (2006.01) |
| B29K 105/00 | (2006.01) |
| B29K 105/24 | (2006.01) |

(52) U.S. Cl.
CPC .......... *C08L 23/30* (2013.01); *B29C 45/0001* (2013.01); *B29C 47/0004* (2013.01); *C08J 3/246* (2013.01); *B29K 2023/16* (2013.01); *B29K 2105/0005* (2013.01); *B29K 2105/24* (2013.01); *C08J 2323/16* (2013.01); *C08J 2423/16* (2013.01)

(58) Field of Classification Search
CPC ... C08J 3/246; C08J 2323/16; B29C 45/0001; B29C 47/0004; C08L 23/30; B29K 2023/16; B29K 2105/0005; B29K 2105/24

See application file for complete search history.

(56) References Cited

U.S. PATENT DOCUMENTS

| | | | |
|---|---|---|---|
| 4,031,176 A | 6/1977 | Molbert | |
| 4,983,685 A * | 1/1991 | Aoshima et al. | .......... C08J 9/10 |
| | | | 525/106 |
| 5,495,680 A | 3/1996 | Mesnel | |
| 6,747,099 B1 | 6/2004 | Novits et al. | |
| 2004/0180985 A1 * | 9/2004 | Novits et al. | ........ C08K 5/3415 |
| | | | 522/172 |
| 2010/0190914 A1 * | 7/2010 | Burrowes et al. | ...... C08L 23/16 |
| | | | 524/517 |

* cited by examiner

Primary Examiner — Nathan M Nutter
(74) Attorney, Agent, or Firm — Lynn B. Morreale

(57) ABSTRACT

A process for crosslinking an elastomer composition in the presence of an organic peroxide formulation is disclosed. The organic peroxide formulation may comprise additional compounds chosen from bis-, tri- and higher poly-maleimides, bis-, tri- and higher poly-citraconimides, peroxide-crosslinkable silicone elastomers, p-phenylenediamine based antiozonants, sulfur containing organic compounds which are accelerators for the sulfur curing (crosslinking) of polymers which are curable/crosslinkable by sulfur, and polysulfide polymers. Methods of manufacturing elastomer articles, methods of reducing mold-fouling, elastomer compositions, and elastomer articles made from the elastomer compositions are also disclosed.

17 Claims, 2 Drawing Sheets

METHODS FOR CROSSLINKING POLYMER COMPOSITIONS IN THE PRESENCE OF ATMOSPHERIC OXYGEN

CROSS-REFERENCE TO RELATED APPLICATIONS

This application is a national stage application under 35 U.S.C. §371 of PCT/US2014/019194, filed Feb. 28, 2014, which claims benefit to U.S. patent application Ser. No. 61/782,055, filed Mar. 14, 2013.

FIELD OF THE INVENTION

The present invention relates to methods for crosslinking polymer compositions in the presence of atmospheric oxygen and to products made by those methods.

BACKGROUND OF THE INVENTION

Polymers and copolymers crosslinked with free radical initiators, organic peroxides and/or azo initiators, are known to have superior properties, particularly compared to polymers crosslinked by sulfur cure. These properties include high heat ageing resistance, low compression set, decreased staining of metal or coated metal sheet and easy production of colored products which have color stability during crosslinking and during long periods of use. These properties make use of peroxide cure of great practical importance. A possible drawback for cure of polymers with free radicals from organic peroxides and azo initiators has been that if air is not excluded from the surface of the material during cure, a tacky surface due to cure inhibition by oxygen in the air may result.

In order to avoid tacky surfaces on objects fabricated using such free radical crosslinking by organic peroxides and/or azo initiators, it has been conventional to exclude air from contact with the surface during cure to avoid the cure inhibition caused by the presence of oxygen. Measures to exclude oxygen add to the cost and complexity of the cure step and sometimes it is difficult, as in the cases of cure in steam autoclaves and in the interior of hoses, to assure the complete exhaustion of air and oxygen. In some cases the manufacturer would like to switch from sulfur to peroxide cure and use existing hot air oven curing chambers. Curing with conventional peroxide systems under these circumstances would not be viable as a tacky surface would result.

U.S. Pat. No. 6,747,099, which is hereby incorporated herein by reference in its entirety, disclosed compositions for providing a tack free surface upon curing.

In order to simplify and reduce the cost and complexity of the cure step, various methods have been suggested for preventing surface cure inhibition by oxygen during free radical crosslinking. These methods have, for various reasons, met with little or no success in actual practice. In particular, none have provided a tack free surface while providing the most desirable physical property of peroxide (azo) cure; superior compression set at 150° C. for 70 hours, compared to about 100° C., i.e., lower temperature performance for the prior art.

Thus, it is desirable to have methods for curing polymers and copolymers that can be performed in the full or partial presence of atmospheric oxygen. It also is desirable to have elastomeric compositions that can be molded and that do not stick to the mold.

SUMMARY OF THE INVENTION

The present invention relates to methods for crosslinking polymer compositions in full or partial contact with atmospheric oxygen and in the presence of an organic peroxide formulation. In addition to at least one organic peroxide, the organic peroxide formulation may comprise at least one additional compound chosen from bis-, tri- and higher poly-maleimides, bis-, tri- and higher poly-citraconimides, peroxide-crosslinkable silicone elastomers, p-phenylenediamine based antiozonants and sulfur containing organic compounds which are accelerators for the sulfur curing (crosslinking) of polymers which are curable/crosslinkable by sulfur and also sulfur compounds which are polysulfide polymers. The invention also relates to compositions containing the crosslinkable polymer compositions, and to the products produced by such processes.

At least one embodiment of the present invention relates to a process for curing an elastomer composition in the presence of oxygen comprising:

A) mixing at least one elastomer, at least one polymer, and at least one organic peroxide formulation to provide a mixture, wherein the elastomer is saturated or unsaturated, the polymer is saturated or unsaturated, and said polymer does not comprise chlorinated polyethylene or chlorosulfonated polyethylene; and wherein the organic peroxide formulation comprises i) at least one organic peroxide, ii) at least one moiety chosen from bis-, tri- and higher poly-maleimides, bis-, tri- and higher poly-citraconimides, and p-phenylenediamine based antiozonants, and iii) at least one sulfur accelerator; and B) curing said mixture in the presence of oxygen.

Embodiments of the present invention also relate to an elastomer composition curable in the presence of oxygen, said composition comprising:

A) at least one elastomer which is saturated or unsaturated;

B) at least one polymer which is saturated or unsaturated;

C) at least one organic peroxide;

D) at least one compound chosen from bis-, tri- and higher poly-maleimides, and bis-, tri- and higher poly-citraconimides; and E) at least one sulfur accelerator;

wherein said at least one polymer does not comprise chlorinated polyethylene or chlorosulfonated polyethylene.

Other embodiments of the present invention relate to a method for manufacturing an article comprising an elastomer composition, as described herein, comprising:

extruding said elastomer composition in the presence of hot air to form an uncured preform article; and curing the uncured preform article.

Embodiments of the present invention also relate to a process for reducing mold-fouling in the presence of oxygen during the manufacture of elastomer articles, comprising:

A) supplying an uncured elastomer composition to a mold, wherein the uncured elastomer composition comprises at least one organic peroxide formulation;

B) curing the elastomer composition to form an elastomer article; and

C) releasing the cured elastomer article from the mold.

Embodiments of the present invention also relate to elastomer compositions comprising an organic peroxide formulation, and to products made by the above methods.

DETAILED DESCRIPTION

Figure 1:
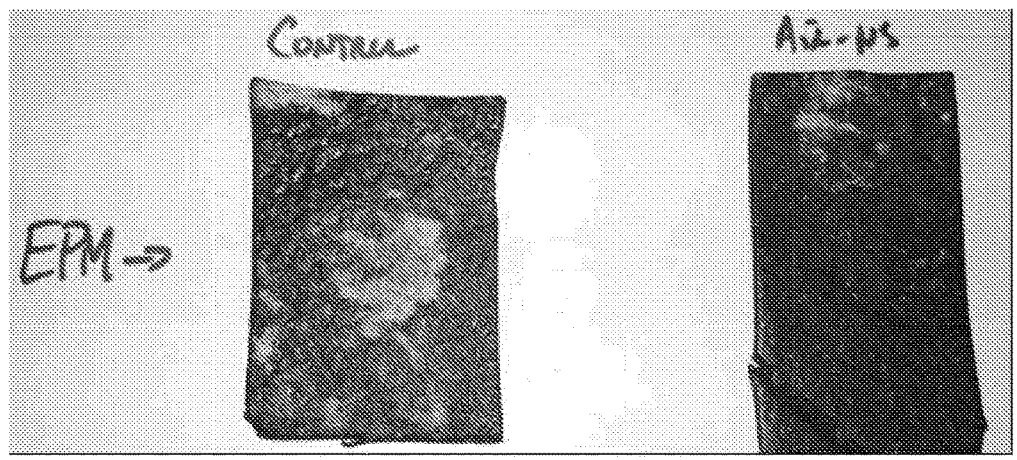
FIG. 1 shows a comparison of two samples of a poly (ethylene propylene) elastomer.

One aspect of the present disclosure relates to a process for curing an elastomer composition, comprising curing an elastomer composition comprising at least one elastomer used alone or in combination with at least one polymer in the full or partial presence of atmospheric oxygen and in the presence of an organic peroxide formulation.

As used herein, the term "polymer" means a non-elastomeric polymer comprised of at least at least one monomer. The term "polymer" encompasses homopolymers and copolymers, where the term "copolymers" refers to a non-elastomeric polymer comprised of at least two different monomers in polymerized form. For example, a copolymer in accordance with the present disclosure may be a polymer comprising two different monomers, a terpolymer comprising three different monomers, or a polymer comprising more than three different monomers.

As used herein, the term "curing" refers to the crosslinking of polymer chains to form a strengthened or hardened polymer.

In at least one embodiment, the elastomer composition may comprise a saturated elastomer, an unsaturated elastomer, or both a saturated and unsaturated elastomer.

Similarly, the at least one polymer of the elastomer composition may comprise a saturated polymer, an unsaturated polymer, or both a saturated and unsaturated polymer.

In at least one embodiment, the polymer of the elastomer composition comprises a copolymer. The embodiments disclosed herein recite elastomer compositions comprising a copolymer. However, as one of ordinary skill in the art would readily appreciate, a homopolymer may be substituted in any embodiment comprising a copolymer, unless expressly indicated to the contrary.

In at least one embodiment, the elastomer composition comprises at least one elastomer and at least one copolymer. The elastomer and copolymer may be present in the elastomer composition at weight ratios ranging from 99:1 to 1:99, such as, for example, from 85:15 to 15:85, or from 75:25 to 25:75. In at least one embodiment, the elastomer and copolymer are present in the elastomer composition in a 50:50 weight ratio.

According to at least one embodiment, the elastomer composition comprises at least one saturated elastomer. The saturated elastomer can be selected from, for example, ethylene-propylene terpolymer (EPDM), fluoroelastomers (FKM, FFKM, FVMQ) (e.g., Viton® and Dyneon®), vinyl silicone rubber (VMQ), and combinations thereof.

Unsaturated elastomers that may be used in the elastomer composition include, for example, nitrite rubber (NBR), acrylonitrile-butadiene-styrene (ABS), styrene butadiene rubber (SBR), styrene-butadiene-styrene block copolymers (SBS), polybutadiene rubber (BR), styrene-isoprene-styrene block copolymers (SIS), halogenated acrylonitrile butadiene (HNBR),natural rubber (NR), synthetic polyisoprene rubber (IR), neoprene rubber (CR), polychloropropene, bromobutyl rubber, chlorobutyl rubber, and combinations thereof.

In accordance with at least one embodiment, the elastomer composition comprises at least one unsaturated polymer. Non-limiting examples of unsaturated polymers that may be used include copolymers of ethylene with propylene, butylene, pentene, hexane, heptane, octane, and vinyl acetate, such as, linear low density polyethylene (LLDPE), low density polyethylene (LDPE), high density polyethylene (HDPE), poly(ethylene vinyl acetate) (EVA), poly(ethylene propylene) (EPM), poly(ethylene octene) (Engage®), poly (ethylene hexene) (Insite Technology®), poly(ethylene butylene) Tafmer®, Vamac® polymers (poly(ethylene methyl acrylate), poly(ethylene acrylate), and combinations with acrylic acid), and combinations thereof.

In at least one embodiment, the elastomer composition does not comprise chlorinated polyethylene or chlorosulfonated polyethylene.

When a foamed product is desired, the elastomer composition may comprise a blowing agent.

The curing, or crosslinking, step may be performed in any conventional manner, such as, for example, hot air, steam, and hot molding.

The organic peroxide formulation comprises at least one organic peroxide. With the exception of hydroperoxides and liquid peroxydicarbonates, all those organic peroxides known to undergo decomposition by heat to generate radicals capable of initiating the desired curing (crosslinking) reactions are contemplated as suitable for use in the present disclosure. Non-limiting examples include dialkyl peroxides, diperoxyketals, mono-peroxy carbonates, cyclic ketone peroxides, diacyl peroxides, organosulfonyl peroxides, peroxyesters and solid, room temperature stable peroxydicarbonates. In at least one embodiment, the organic peroxide is selected from dialkyl peroxides, peroxyketals, cyclic ketone peroxides and diacyl peroxides. Peroxide names and physical properties for all these classes of organic peroxides can be found in "Organic Peroxides" by Jose Sanchez and Terry N. Myers; Kirk-Othmer Encyclopedia of Chemical Technology, Fourth Ed., Volume 18, (1996).

Illustrative dialkyl peroxide initiators include:
di-t-butyl peroxide;
t-butyl cumyl peroxide;
2,5-di(cumylperoxy)-2,5-dimethyl hexane;
2,5-di(cumylperoxy)-2,5-dimethyl hexyne-3;
4-methyl-4-(t-butylperoxy)-2-pentanol;
4-methyl-4-(t-amylperoxy)-2-pentanol;
4-methyl-4-(cumylperoxy)-2-pentanol;
4-methyl-4-(t-butylperoxy)-2-pentanone;
4-methyl-4-(t-amylperoxy)-2-pentanone;
4-methyl-4-(cumylperoxy)-2-pentanone;
2,5-dimethyl-2,5-di(t-butylperoxy)hexane;
2,5-dimethyl-2,5-di(t-amylperoxy)hexane;
2,5-dimethyl-2,5-di(t-butylperoxy)hexyne-3;
2,5-dimethyl-2,5-di(t-amylperoxy)hexyne-3;
2,5-dimethyl-2-t-butylperoxy-5-hydroperoxyhexane;
2,5-dimethyl-2-cumylperoxy-5-hydroperoxy hexane;
2,5-dimethyl-2-t-amylperoxy-5-hydroperoxyhexane;
m/p-alpha, alpha-di[(t-butylperoxy)isopropyl]benzene;
1,3,5-tris(t-butylperoxyisopropyl)benzene;
1,3,5-tris(t-amylperoxyisopropyl)benzene;
1,3,5-tris(cumylperoxyisopropyl)benzene;
di[1,3-dimethyl-3-(t-butylperoxy)butyl]carbonate;
di[1,3-dimethyl-3-(t-amylperoxy)butyl]carbonate;
di[1,3-dimethyl-3-(cumylperoxy)butyl]carbonate;
di-t-amyl peroxide;
t-amyl cumyl peroxide;
2,4,6-tri(butylperoxy)-s-triazine;
1,3,5-tri[1-(t-butylperoxy)-1-methylethyl]benzene
1,3,5-tri-[(t-butylperoxy)-isopropyl]benzene;
1,3-dimethyl-3-(t-butylperoxy)butanol;
1,3-dimethyl-3-(t-amylperoxy)butanol; and mixtures thereof.

Illustrative solid, room temperature stable peroxydicarbonates include, but are not limited to:

di(2-phenoxyethyl)peroxydicarbonate; di(4-t-butyl-cyclohexyl)peroxydicarbonate; dimyristyl peroxydicarbonate; dibenzyl peroxydicarbonate; and di(isobornyl)peroxydicarbonate.

Another class of dialkylperoxides which may be used singly or in combination with the other free radical initiators contemplated by the present disclosure are those selected from the group represented by the formula:

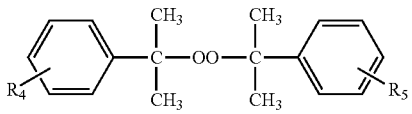

wherein $R_4$ and $R_5$ may independently be in the meta or para positions and are the same or different and are selected from hydrogen or straight or branched chain alkyls of 1 to 6 carbon atoms. Dicumyl peroxide and isopropylcumyl cumyl peroxide are illustrative.

Other dialkyl peroxides include:
3-cumylperoxy-1,3-dimethylbutyl methacrylate;
3-t-butylperoxy-1,3-dimethylbutyl methacrylate;
3-t-amylperoxy-1,3-dimethylbutyl methacrylate;
tri(1,3-dimethyl-3-t-butylperoxy butyloxy)vinyl silane;
1,3-dimethyl-3-(t-butylperoxy)butyl N-[1-{3-(1-methylethenyl)-phenyl}1-methylethyl]carbamate;
1,3-dimethyl-3-(t-amylperoxy)butyl N-[1-{3-(1-methylethenyl)-phenyl}-1-methylethyl]carbamate;
1,3-dimethyl-3-(cumylperoxy))butyl N-[1-{3-(1-methylethenyl)-phenyl}-1-methylethyl]carbamate.

In the group of diperoxyketal initiators, the preferred initiators include:
1,1-di(t-butylperoxy)-3,3,5-trimethylcyclohexane;
1,1-di(t-butylperoxy)cyclohexane;
n-butyl 4,4-di(t-amylperoxy)valerate;
ethyl 3,3-di(t-butylperoxy)butyrate;
2,2-di(t-amylperoxy)propane;
3,6,6,9,9-pentamethyl-3-ethoxycabonylmethyl-1,2,4,5-tetraoxacyclononane;
n-butyl-4,4-bis(t-butylperoxy)valerate;
ethyl-3,3-di(t-amylperoxy)butyrate; and mixtures thereof.

Other peroxides that may be used according to at least one embodiment of the present disclosure include benzoyl peroxide, OO-t-butyl-O-hydrogen-monoperoxy-succinate and OO-t-amyl-O-hydrogen-monoperoxy-succinate.

Illustrative cyclic ketone peroxides are compounds having the general formulae (I), (II) and/or (III).

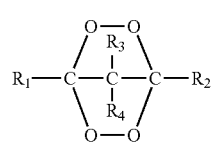
(I)

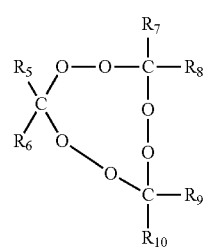
(II)

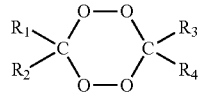
(III)

wherein $R_1$ to $R_{10}$ are independently selected from the group consisting of hydrogen, C1 to C20 alkyl, C3 to C20 cycloalkyl, C6 to C20 aryl, C7 to C20 aralkyl and C7 to C20 alkaryl, which groups may include linear or branched alkyl properties and each of $R_1$ to $R_{10}$ may be substituted with one or more groups selected from hydroxy, C1 to C20 alkoxy, linear or branched C1 to C20 alkyl, C6 to C20 aryloxy, halogen, ester, carboxy, nitride and amido, such as, for example, at least 20% of the total active oxygen content of the peroxide mixture used for a crosslinking reaction will be from compounds having formulas (I), (II) and/or (III).

Some examples of suitable cyclic ketone peroxides include:
3,6,9, triethyl-3,6,9-trimethyl-1,4,7-triperoxynonane (or methyl ethyl ketone peroxide cyclic trimer), methyl ethyl ketone peroxide cyclic dimer, and 3,3,6,6,9,9-hexamethyl-1,2,4,5-tetraoxacyclononane.

Illustrative examples of peroxy esters include:
2,5-dimethyl-2,5-di(benzoylperoxy)hexane;
t-butylperbenzoate;
t-butylperoxy acetate;
t-butylperoxy-2-ethyl hexanoate;
t-amyl perbenzoate;
t-amyl peroxy acetate;
t-butyl peroxy isobutyrate;
3-hydroxy-1,1-dimethyl t-butyl peroxy-2-ethyl hexanoate;
OO-t-amyl-O-hydrogen-monoperoxy succinate;
OO-t-butyl-O-hydrogen-monoperoxy succinate;
di-t-butyl diperoxyphthalate;
t-butylperoxy (3,3,5-trimethylhexanoate);
1,4-bis(t-butylperoxycarbo)cyclohexane;
t-butylperoxy-3,5,5-trimethylhexanoate;
t-butyl-peroxy-(cis-3-carboxy)propionate;
allyl 3-methyl-3-t-butylperoxy butyrate.

Illustrative monoperoxy carbonates include:
OO-t-butyl-O-isopropylmonoperoxy carbonate;
OO-t-butyl-O-(2-ethyl hexyl)monoperoxy carbonate;
1,1,1-tris[2-(t-butylperoxy-carbonyloxy)ethoxymethyl]propane;
1,1,1-tris[2-(t-amylperoxy-carbonyloxy)ethoxymethyl]propane;
1,1,1-tris[2-(cumylperoxy-carbonyloxy)ethoxymethyl]propane;
OO-t-amyl-O-isopropylmonoperoxy carbonate.

Illustrative diacyl peroxides include:
di(4-methylbenzoyl)peroxide;
di(3-methylbenzoyl)peroxide;
di(2-methylbenzoyl)peroxide;
didecanoyl peroxide; dilauroyl peroxide;
2,4-dibromo-benzoyl peroxide;
succinic acid peroxide.
dibenzoyl peroxide;
di(2,4-dichloro-benzoyl)peroxide.

Imido peroxides of the type described in PCT Application publication WO9703961 A1 6 Feb. 1997 are also contemplated as suitable for use.

The organic peroxide formulation and/or mixture may also comprise at least one additional compound chosen from substances including bis-, tri- and higher poly-maleimides, bis-, tri- and higher poly-citraconimides, as p-phenylenediamine based antiozonants, sulfur containing organic compounds which are accelerators for the sulfur curing (crosslinking) of polymers which are curable/crosslinkable by sulfur, and polysulfide polymers. In at least one embodiment, the organic peroxide formulation and/or mixture may also comprise an azo-initiator.

In at least one embodiment, the organic peroxide formulation comprises a maleimide compound of Formula IV:

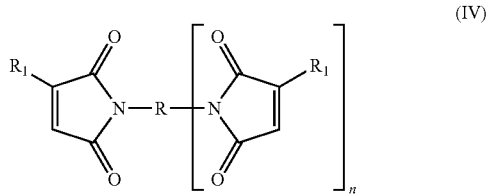

wherein n is 1, or 2 and R is divalent, or trivalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms and alkyl aromatic groups having from about 7 to 24 carbon atoms, and wherein those divalent, or trivalent groups may contain one or more heteroatoms selected from O, N and S, replacing a carbon atom, or atoms, and each $R_1$ is identical and is hydrogen or an alkyl group of 1 to 18 carbon atoms.

One of skill in the art will recognize that the other compounds falling within the scope of Formula IV are all solid materials, are all trimaleimides, bismaleimides, tricitraconimides, or bis citraconimides and can all be combined with the compounds of the organic peroxide formulation. The bismaleimides and biscitraconimides are all either commercially available or can be readily synthesized by methods well known in the art. See, for example, U.S. Pat. Nos. 5,494,948, 5,616,666, 5,292,815 and the references cited therein for synthetic methods, each of which is incorporated herein in it entirety.

The trimaleimides and tricitraconimides as well as the higher polymaleimides and citraconimides may be prepared by analogous techniques if they are not commercially available. For example, the trimaleimide, N,N',N''-(1,3,5-triazine-2,4,6-triyl)trimaleimide has CAS number CAS(67460-81-5).

Some primary amines suitable for synthesis of the di, tri- and higher polymaleimides and analogous citraconimides are polyfunctional primary amines such as melamine and the various polyoxypropylene amines such as the polyoxypropylene diamines and the polyoxypropylene triamines sold under the JEFFAMINE tradename by Huntsman Corporation.

In addition to the N,N'-m-phenylene-bismaleimide specifically referenced above, other bismaleimides, in addition to those disclosed in the above referenced patents, suitable for use in the organic peroxide formulation, without limiting the generality of the above general Formula (IV), are:

N,N'-ethylenebismaleimide, N,N'-hexamethylenebismaleimide, N,N'-dodecamethylene-bismaleimide, N,N'-(2,2,4-trimethylhexamethylene)bismaleimide, N,N'-(oxy-dipropylene)bismaleimide, N,N'-(aminodipropylene)bismaleimide, N,N'-(ethylenedioxy-dipropylene)bismaleimide, N,N'(1,4-cyclohexylene)bismaleimide, N,N'-(1,3-cyclohexylene)bismaleimide, N,N'-(methylene 1,4-dicyclohexylene)bismaleimide, N,N'-(isopropylidene-1,4-dicyclohexylene) bismaleimide, N,N'-(oxy-1,4-dicyclohexylene) bismaleimide, N,N'-p-(phenylene)bismaleimide, N,N'-(o-phenylene)bismaleimide, N,N'-(1,3-naphthylene) bismaleimide, N,N'-(1,4-naphthylene)bismaleimide, N,N'(1, 5-naphthylene)bismaleimide, N,N-(3,3'-dimethyl-4,4'-diphenylene)bismaleimide, N,N'-(3,3-dichloro-4,4'-biphenylene)bismaleimide, N,N'-(2,4-pyridyl) bismaleimide, N,N'-2,6-pyridyl)bismaleimide, N,N'-(1,4-anthraquinonediyl)bismaleimide, N,N'-(m-tolylene) bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene) bismaleimide, N,N'-(5-hydroxy-1,3-phenylene) bismaleimide, N,N'-(5-methoxy-1,3-phenylene) bismaleimide, N,N'-(m-xylylene)bismaleimide, N,N'-(p-xylylene)bismaleimide, N,N'-(methylenedi-p-phenylene) bismaleimide, N,N'-(isopropylidenedi-p-phenylene) bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene)bismaleimide, N,N'-(carbonyldi-p-phenylene)bismaleimide, α,α-bis-(4-maleimodophenyl)-meta-diisopropylbenzene, α,α-bis-(4-p-phenylene)bismaleimide and α,α-bis-(4-maleimidophenyl)para-diisopropylbenzene.

Combinations of two or more bismaleimides, or bismaleimides with the trimaleimides, and with the higher polymaleimides in the compositions and processes of the invention are also contemplated as equivalents and one of skill in the art would understand that such tri and higher polymaleimides and their substitution for the compounds and processes specifically illustrated herein for the practice of the invention to be such equivalents and to be well within the scope contemplated by the invention.

Biscitraconimides, which may be substituted in whole or in part for the N,N'-m-phenylenebismaleimide referenced above include as representative examples:

1,2-N,N'-dimethylene biscitraconimide;
1,2-N,N'-trimethylene biscitraconimide;
1,5-N,N'-2-methyl-pentamethylene)-biscitraconimide; and
N,N'-methylphenylene biscitraconimide.

Mixtures of biscitraconimides and mixtures of bismaleimides and biscitraconimides as well as those including the trimaleimides may also be used in the organic peroxide formulation.

The biscitraconimides are all well-known compounds and where not commercially available, they may be readily synthesized by methods detailed in the art. U.S. Pat. No. 5,292,815 in column 4, provides a detailed list of such methods. As stated above, the tri- and higher polycitraconimides may be prepared by analogous methods and substituted in whole or in part in the organic peroxide formulation of the preset disclosure and such compounds and substitutions will be understood by one of skill in the art as being a full equivalent to those specifically illustrated herein and well within the scope contemplated as equivalent by the invention.

In accordance with at least one embodiment, the organic peroxide formulation may also comprise a silicone elastomer. Silicone elastomers that may be used in the organic peroxide formulation include, for example, unsaturated peroxide crosslinkable silicone elastomers comprising at least one site of unsaturation (such as a vinyl group) per molecule. In one embodiment, the silicone elastomer comprises a plurality of sites of unsaturation. One exemplary class of peroxide crosslinkable silicone elastomers comprises dimethyl vinyl substituted silicone derivative elastomers which are well known in the art. See, for example, "Kirk Othmer Encyclopedia of Chemical Technology", Vol. 20, pp. 943 et seq., John Wiley & Sons, ©1982, incorporated herein.

In at least one embodiment, the organic peroxide formulation also comprises a sulfur containing organic compound capable of accelerating sulfur vulcanization of polymers, which are capable of being crosslinked by sulfur. Exemplary sulfur containing organic compounds capable of accelerating sulfur vulcanization of polymers are well known in the art. Many different classes of these compounds are known and all are contemplated as equivalent.

The Vanderbilt Rubber Handbook, thirteenth edition, 1990, R.T. Vanderbilt Company, Inc., publisher lists many types. Illustrative of these are derivatives of benzothiazoles, thiadiazoles, sulfenamides, sulfenimides, dithiocarbamates, thiurams, imidazoles, xanthates, and thioureas. Also included in this general class of sulfur compound sulfur accelerators are sulfides, disulfides (e.g., diallyldisulfide) polysulfides and arylpolysulfide compounds such as the amylphenol polysulfides e.g. VULTAC® products from Arkema and other sulfides such as disulfide and/or other known sulfur accelerating polysulfide phosphate, dithiophosphates and/or phosphorous and sulfur containing compounds. Other sulfur containing organic compounds capable of sulfur donation at vulcanization temperatures which are known but are not presently used for such reactions because of cost concerns are also contemplated as equivalents. Illustrative of these is the compound 2-(2,4-cyclopentadiene-1-ylidene)-1,3-dithiolane.

In at least one embodiment, one sulfur accelerator class includes salts of disubstituted dithiocarbamic acid.

These salts have the general structure:

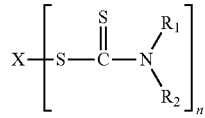

wherein X is an ion derived from a metal selected from the group consisting of nickel, cobalt, iron, chromium, tin, zinc, copper, lead, bismuth, cadmium, selenium and tellurium, or X is a quaternary ammonium ion, n may vary from 1 to 6 and is equal to the number of formal positive charges on the X ion, and $R_1$ and $R_2$ are independently alkyl of 1 to 7 carbon atoms.

Examples of the salts of disubstituted dithiocarbamic acid include:
bismuth dimethyldithiocarbamate;
cadmium diethyldithiocarbamate;
cadmium diamyldithiocarbamate;
copper dimethyldithiocarbamate;
lead diamyldithiocarbamate;
lead dimethyldithiocarbamate;
selenium diethyldithiocarbamate;
selenium dimethyldithiocarbamate;
tellurium diethyldithiocarbamate;
piperidinium pentamethylene dithiocarbamate;
zinc diamyldithiocarbamate;
zinc diisobutyldithiocarbamate
zinc diethyldithiocarbamate;
zinc dimethyldithiocarbamate;
copper dibutyldithiocarbamate;
sodium dimethyldithiocarbamate;
sodium diethyldithiocarbamate;
sodium dibutyldithiocarbamate;
zinc di-n-butyldithiocarbamate;
zinc dibenzyldithiocarbamate.

A second sulfur accelerator class suitable for use in the organic peroxide formulation comprises the thiurams. These are prepared from secondary amines and carbon disulfide and possess the general structure:

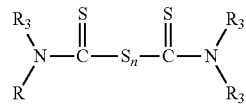

wherein $R_3$ is an alkyl group of from 1 to about 7 carbon atoms or the $R_3$ groups on each particular nitrogen atom may be concatenated to form, together with the nitrogen atom on which they are attached, a five, six or seven membered heterocyclic ring containing 4, 5 or 6 carbon atoms respectively and n may have a positive value from greater than zero up to 6.

Examples of thiuram sulfur accelerators include:
dipentamethylenethiuram tetrasulfide and hexasulfide;
tetrabutylthiuram disulfide;
tetramethylthiuram disulfide;
tetraethylthiuram disulfide;
tetramethylthiuram monosulfide;
isobutylthiuram disulfide;
dibenzylthiuram disulfide;
tetrabenzylthiuram disulfide;
tetraisobutylthiuram disulfide;
isobutylthiuram monosulfide;
dibenzylthiuram monosulfide;
tetrabenzylthiuram mono sulfide;
tetraisobutylthiuram monosulfide.

The higher multisulfides of the various thiurams are also sulfur donors.

Derivatives of thiadiazoles are, but not limited to, monobenzoyl derivatives of dimercaptothiadiazole (2,5-dimethyl-1,3,4-thiadiazole); the proprietary thiadiazole of the Vanderbilt Rubber Company identified as VANAX® 189; 1,2,4-thiadiazole, 5-ethoxy-3-(trichloromethyl)thiadiazole; and alkyl mercaptothiadiazoles, e.g. methyl mercapto thiadiazole.

Derivatives of benzothiazoles have the general structure:

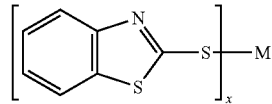

wherein M is a direct bond between two sulfur atoms, H, or an ion derived from a metal selected from the group consisting of nickel, cobalt, iron, chromium, tin, zinc, copper, lead, bismuth, cadmium, selenium and tellurium; and when M is H, x is 1; when M is a direct bond between two sulfur atoms, x is 1 or 2; and when M is an ion derived from a metal, x is equal to the formal valence of the metal ion; and if M is a direct bond between two sulfur atoms and x is 1, then the second sulfur atom to which the M bond is attached is also bonded to a 4-morpholinyl radical.

Illustrative compounds include: 2-(4-morpholinodithio) benzothiazole; benzothiazyl disulfide; 2-mercapto-benzothiazole; 2-mercaptobenzothiazole disulfide; sodium-2-mercaptobenzothiazolate; zinc-2-mercapto-benzothiazole; copper-2-mercaptobenzothiazolate; 2-N-cyclohexylaminobenzothiazole; N-cyclohexylamino-2-benzothiazole polysulfide; 2-bisbenzothiazole-2,2-polysulfide and 2-bisbenzothiazole-2,2-disulfide; bis(2,2'-benzothiazyldisulfide).

The sulfenamide accelerators are also well known. Illustrative examples include: N-oxydiethylene-2-benzothiazole sulfenamide; N-oxydiethylene thiocarbamyl-N-oxydiethylene sulfenamide; N-cyclohexyl-2-benzothiazole sulfenamide; N-t-butyl-2-benzothiazole sulfenamide; N-cyclohexyl-2-benzothiazylsulfeneamide; N,N-dicyclohexyl benzthiazyl sulfenamide; N-t-butyl-2-benzothiazole sulfenamide. There are also sulfenimide compounds, e.g., N-t-butyl-benzothiazole-2-sulfenimide.

Typical imidazoles include: 2-mercaptobenzimidazole, 2-mercaptomethylbenzimidazole; and the zinc salt of 2-mercaptobenzimidazole.

Zinc isopropyl xanthate is a typical xanthate sulfur accelerator.

Typical thioureas include: trimethylthiourea; 1,3-diethyl-thiourea and 1,3-dibutylthiourea; ethylene thiourea; blend of dialkyl thioureas; diphenyl thiourea; diorthotolyl thiourea; dimethyl thiourea; diethyl thiourea; dibutyl thiourea.

Alkylphenoldisulfide types of sulfur accelerators are illustrated by the compounds available from Arkema, under the designation VULTAC® 2, VULTAC® 3 and VULTAC® 5.

Thiophosphate sulfur accelerators are illustrated by such compounds as copper dialkyldithiophosphate; zinc dialkyldithiophosphate; zinc amine dithiophosphate; zinc dibutyldithophosphate; copper O,O-diisopropyl-phosphorodithiolate; and zinc OO-diisopropylphosphorodithiolate.

Other miscellaneous sulfur accelerators include 4,4-dithiodimorpholine; N,N'-caprolactam disulfide; and dibutylxanthogen disulfide.

In at least one embodiment, the organic peroxide formulation also comprises an azo initiator. The azo initiators are those known in the art, such as 2,2'-azobis-(2-acetoxypropane), to generate free radicals on heat decomposition capable of inducing the desired curing (crosslinking) reaction. The azo initiators of U.S. Pat. Nos. 3,862,107 and 4,129,531, the disclosures of which are incorporated herein by reference, are also suitable.

One of skill in the art will readily be able to select suitable quantities of the various ingredients for use in the organic peroxide formulation and will quickly and easily be able to optimize the concentrations through a series of bench scale trials employing increasing amounts of the ingredients in samples of the polymer to be cured (crosslinked). The optimum processing (compounding) time and temperatures and the like may also be determined from the same trials as will the optimum cure time and temperature.

In at least one embodiment, the compounds of Formula (IV) (the bismaleimides and biscitraconimides) are present in the organic peroxide formulation in quantities which will provide from about 0.2 parts by weight per part of polymer by weight (phr) to about 10.0 phr, such as, from about 1.0 phr to about 5.0 phr, or from about 1.5 phr to about 3.0 phr.

In at least one embodiment, the sulfur containing organic compound(s) capable of accelerating sulfur vulcanization in polymers capable of being crosslinked by sulfur are present in the organic peroxide formulation in quantities which will provide from about 0.01 phr to about 20 phr, such as from about 0.1 to about 10 phr, such as from about 0.1 phr to about 5 phr, such as from about 0.1 phr to about 1.0 phr, or from about 0.1 phr to about 0.5 phr. It is understood by those of skill in the art that these compounds are of two types, those that donate sulfur to the vulcanization and those which simply accelerate sulfur vulcanization. Either class of compound or mixtures thereof are contemplated as equivalents by the invention.

Alkyl phenol disulfide polymers of the type sold by Arkema under the trade name VULTAC® may be used in amounts from about 0.5 phr to 20 phr when used alone or at from about 0.1 phr to about 10 phr when in combination with other sulfur accelerators.

In at least one embodiment, the organic peroxide and optional azo initiator is present in the organic peroxide formulation in quantities of from about 0.04 to about 10 phr, such as from about 0.1 to about 5phr, such as from about 1 to about 4 phr.

The time-temperature conditions necessary for curing largely depend on the structure of the free radical curing agent. For the azo initiators, suitable conditions are detailed in U.S. Pat. Nos. 3,632,107 and 4,129,531, each of which is incorporated herein in its entirety.

For the elastomer compositions of the present disclosure, appropriate time and temperature conditions may be determined for crosslinking a particular polymer composition by running a small number of well controlled rheometer studies and selecting values from the results of those studies where the time/temperature relationship is from five to fifteen times the half life value for the free radical initiator in the system.

In at least one embodiment, other conventional additives such as anti-oxidants (e.g., hindered phenols and polymeric quinoline derivatives), aliphatic process oils, and other process aids, pigments, dyes, tackifiers, waxes, reinforcing aids, UV stabilization agents, blowing agents and activators and antiozonants may also be present in the elastomer compositions before, after and during the curing step.

The polysulfide polymers in at least one embodiment of the present disclosure are those known polysulfide polymers which are prepared by the reaction of an α,ω-dihaloalkyl (or dihaloheteroalkyl) compound with a metallic, such as an alkali metal, polysulfide. The common commercially available polysulfide polymers are either liquids or solids, are either thiol or hydroxy terminated and are derived from materials produced by the reaction of 1,2-dichloroethane, 2,2'dichloro diethyl ether or bis(2-chloroethyl)formal with an alkali metal polysulfide ($MS_x$) wherein M is an alkali metal ion, such as those derived from sodium and x is a number greater than 1 up to about six.

The invention contemplates that polysulfide polymers may be used in place of or in admixture with the compounds chosen from p-phenylenediamine based antiozonants and sulfur containing organic compounds selected from the group consisting of sulfur containing organic compounds capable of accelerating sulfur vulcanization of polymers capable of being crosslinked by sulfur ("sulfur accelerators"), polysulfide polymers and mixtures of said sulfur containing compounds in equal quantities to those previously specified for those compounds. Since an excess of polysulfide polymer is not contemplated as detrimental to the practice of the invention, it is also contemplated that they may be pre-blended with the compounds of Formula (IV) (the bismaleimide and biscitraconimides) and optionally with the free radical initiator(s) to form master batches, either solid or liquid. The polysulfide polymers may also be pre-blended into the polymer to be cured and the compounds of Formula (IV) and also the free radical initiator(s) blended in simultaneously or subsequently at the option of the operator. Use of the polysulfide polymers in combination with the other sulfur may permit reduction of the amount of sulfur accelerator used.

In at least one embodiment of the present disclosure, the organic peroxide formulation comprises at least one organic peroxide and:

a) at least one compound (A) selected from the group consisting of silicone elastomers and a compound having the formula (I):

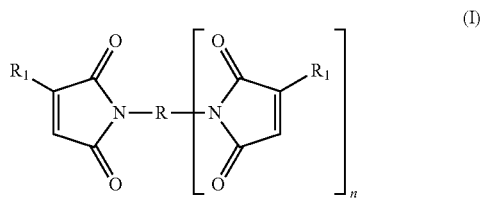

wherein n is 1 or 2 and R is divalent, or trivalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms and alkyl aromatic groups having from about 7 to 24 carbon atoms, and wherein those divalent, or trivalent groups may contain one or more heteroatoms selected from O, N and S, replacing a carbon atom, or atoms, and each $R_1$ is identical and is hydrogen or an alkyl group of 1 to 18 carbon atoms; and (b) at least one compound (B) selected from the group consisting of p-phenylenediamine based antiozonants and sulfur containing organic compounds selected from the group consisting of sulfur containing organic compounds capable of accelerating sulfur vulcanization of polymers capable of being crosslinked by sulfur ("sulfur accelerators"), polysulfide polymers and mixtures of said sulfur containing compounds.

In at least one embodiment of the present disclosure, the organic peroxide formulation comprises a mixture of dipentamethylene thiuram tetra-sulfide (such as SULFADS®), N,N'-m-phenylene bismaleimide (such as HVA-2) and 1,1-di(t-butylperoxy)-3,3,5-trimethylcyclohexane (such as LUPEROX® 231 XL), which may be used to cure ethylene propylene copolymer (VISTALON® 504) in hot air.

To prepare the mixture of SULFADS®, HVA-2 and LUPEROX 231 XL, the ingredients, which are all in dry powder form (the LUPEROX® 231 XL is in the form of 40% by weight peroxide dispersed on calcium carbonate), may be mixed in any order and then compounded by standard methods (Banbury, two roll mill, extruder and the like) into the VISTALON® polymer. The SULFADS®, HVA-2 and LUPEROX 231 XL may also be compounded directly into the VISTALON either simultaneously or sequentially in any order. Any two of the SULFADS®, HVA-2 and LUPEROX® 231 XL ingredients may be mixed and compounded into the VISTALON® separately or simultaneously with the third ingredient. This compounding, if done separately, may also be performed in any order of ingredient addition to the polymer, but it is preferred if the peroxide is added last.

Once compounding with the VISTALON® is complete, the compounded mixture may be cured simply by placing it in a hot air oven at a suitable temperature for initiating cure by decomposition of the peroxide, conveniently, in this case, at about 365° F. (about 185° C.), for a sufficient period of time to permit the desired degree of crosslinking to take place, conveniently, in this case, about one minute, for a thin sample at room temperature at the start.

At least one embodiment of the present disclosure relates to a method for manufacturing an article comprising the elastomer composition described above. In at least one embodiment, the article may comprise a seal, hose, or gasket. The method may comprise extruding an elastomer composition, as described above, wherein the elastomer composition comprises an organic peroxide formulation to form an uncured preform article, and curing the uncured preform article. The elastomer composition may be extruded in the presence of hot air to form the uncured preform. In at least one embodiment, the preform is cured using microwaves or a steam autoclave. In at least one other embodiment, the preform is cured without using microwaves or a steam autoclave.

In at least one embodiment, the elastomer composition may comprise at least one unsaturated elastomer and at least one saturated elastomer.

The method for manufacturing the article may be performed in a hot air tunnel, or any other known apparatus.

In at least one embodiment, the method for manufacturing the article can be formed continuously. Continuous manufacturing may allow for the production of a continuous article, such as a continuous seal, as opposed to seals that must be pieced together from smaller parts.

The present disclosure also relates to automotive, industrial, or residential seals manufactured according to the methods disclosed herein.

At least one embodiment of the present disclosure relates to a method for manufacturing hose. The method may comprise extruding a length of hose from an elastomer composition without curing the length of hose. The length of uncured hose may be collected and then cured, such as by exposing the uncured hose to steam.

The present disclosure also relates to a process for reducing mold-fouling in the presence of oxygen during the manufacture of elastomer articles. In prior methods, oxygen present in a mold would prevent the complete reaction of the elastomer, leaving a residue of uncured elastomer that would build up in the mold. This build-up would need to be cleaned out periodically.

In at least one embodiment, the present invention provides a process for reducing mold-fouling in the presence of oxygen comprises supplying an uncured elastomer composition to a mold, wherein the uncured elastomer composition comprises at least one organic peroxide formulation. The elastomer composition may then be heated to a temperature sufficient to cure the elastomer composition to form an elastomer article, followed by releasing the elastomer article from the mold.

The present disclosure also relates to a method for manufacturing an elastomer article composed of at least one elastomer and at least one unsaturated polymer. The method may comprise extruding an curing an elastomer composition in the presence of hot air to form an elastomer article wherein the elastomer composition comprises an organic peroxide formulation.

Exemplary elastomeric articles that may be made in accordance with the methods of the present disclosure include O-rings, gaskets, diaphragms, seals, grommets, electrical insulators, shoe soles, septums, fittings, shrouds, sheets, belts, tubes, etc.

The embodiments described herein are intended to be exemplary of the invention and not limitations thereof. One skilled in the art will appreciate that modifications to the embodiments and examples of the present disclosure may be made without departing the scope of the present disclosure. The embodiments of the invention are described above using the term "comprising" and variations thereof. However, it is the intent of the inventors that the term "comprising" may be substituted in any of the embodiments described herein with "consisting of" and "consisting essentially of" without departing the scope of the invention.

The following examples further illustrate the best mode contemplated by the inventors for the practice of their invention and are to be construed as illustrative and not in limitation thereof.

EXAMPLES

Several peroxide-elastomer compositions were prepared and cured in a hot air oven at 215° C. for 15 minutes.

The peroxide-elastomer compositions studied were labeled as either "Control" or "AIR-NS" and are provided below. Three elastomers were studied and discussed in the following order.
1. Poly(ethylene propylene) elastomer (EPM) Composition
2. Poly(ethylene propylene diene) elastomer (EPDM) Composition
3. A Blend of 54% EPDM and 46% EPM Elastomers Flat uncured sheets of the elastomer-peroxide compositions were hung from metal clips in a hot air oven set to 215C and cured for 15 minutes. After 15 minutes, the cured samples were quickly taken out of the air oven, placed on the bench and immediately a paper towel was firmly pressed into the very hot surface of the sheet for one minute. The paper towel was then removed from the cured elastomer sheet. The cooled sample was mounted on a labeled card stock so a picture could be taken of the surface. This was done to visually judge the ability of the composition to create a tack-free surface by the amount of white paper towel fibers stuck to the surface. The samples of elastomer were also tested for MH-ML (dN-m) relative degree of crosslinking performance using an Alpha Technologies RPA® Rheometer.

1. Poly(ethylene propylene) Elastomer (EPM)

| Sample Identification: | (phr) Control | (phr) AIR-NS |
|---|---|---|
| EPM | 100.00 | 100.00 |
| N660 carbon black | 130.40 | 130.40 |
| N990 carbon black | 24.20 | 24.20 |
| Zinc Oxide | 5.00 | 5.00 |
| Stearic Acid | 0.50 | 0.50 |
| Calcium Carbonate | 55.00 | 55.00 |
| Talc | 20.00 | 20.00 |
| Polyethylene Glycol | 3.00 | 3.00 |
| Calcium Oxide | 5.00 | 5.00 |
| Paraffinic Oil | 86.00 | 86.00 |
| Sartomer ® SR-350 | 3.00 | — |
| Vul-Cup ® 40KE | 6.00 | 6.00 |
| Vanax ® MBM | — | 2.70 |
| Vanax ® A | — | 0.30 |
| Vultac ® 5 | — | 0.91 |
| Durax ® | — | 0.09 |
| Relative Degree of Crosslinking RPA ® DATA at 185° C., 1°arc, 100 cpm | | |
| MH-ML (dN-m) | 4.56 | 5.13 |

Vul-Cup ® 40KE: m/p-di(t-butylperoxy)diisopropylbenzene 40% on Burgess Clay (Arkema Inc.)
Sartomer ® SR-350: trimethylolpropane trimethacrylate (Arkema Inc.)
Vanax ® MBM: meta-N.N'-phenylene bismaleimide (R. T. Vanderbilt)
Vanax ® A: 4,4'-dithiodimorpholine (R. T. Vanderbilt)
Vultac ® 5: alkyl phenol disulfide oligomers (R. T. Vanderbilt)
Durax ®: N-cyclohexyl-2-benzothiazolesulfenamide (R. T. Vanderbilt)

Pictures of elastomer-peroxide compositions which were cured in a hot air oven at 215 C for 15 minutes and immediately subjected to a paper towel test for surface cure, are provided in FIG. 1. This paper towel test provides a very good indication of complete surface cure. Any areas where the surface of the elastomer is not fully cured will be quite sticky, and the paper towel fibers will adhere to the sticky, uncured surface of the elastomer composition.

The "Control" composition using an EPM elastomer-peroxide blend provided a very rough surface with considerable paper towel fibers that had adhered to the uncured sticky surface. The peroxide-elastomer composition labeled "AIR-NS" using EPM also resulted in an undesirable rough surface, although to a lesser extent than the "Control" composition. Noticeable paper towel fibers stuck to the surface indicating a sticky non-cured surface were found on both samples. Uncured surface areas would be considered a serious defect in automotive gasket seals.

2. Poly(ethylene propylene diene) Elastomer (EPDM)

| Sample Identification: | (phr) Control | (phr) AIR-NS |
|---|---|---|
| EPDM | 100.00 | 100.00 |
| N550 carbon black | 100.00 | 100.00 |
| Paraffinic Oil | 40.00 | 40.00 |
| Polyethylene Glycol | 3.00 | 3.00 |
| 2,2,4-trimethyl-1,2-dihydroquinoline | 1.00 | 1.00 |
| Sartomer ® SR-350 | 3.00 | — |
| Vul-Cup ® 40KE | 6.00 | 6.00 |
| Vanax ® MBM | — | 2.70 |
| Vanax ® A | — | 0.30 |
| Vultac ® 5 | — | 0.91 |
| Durax ® | — | 0.09 |
| Relative Degree of Crosslinking RPA ® DATA at 185° C., 1°arc, 100 cpm | | |
| MH-ML (dN-m) | 41.31 | 36.31 |

Vul-Cup ® 40KE: m/p-di(t-butylperoxy)diisopropylbenzene 40% on Burgess Clay (Arkema Inc.)
Sartomer ® SR-350: trimethylolpropane trimethacrylate (Arkema Inc.)
Vanax ® MBM: meta-N.N'-phenylene bismaleimide (R. T. Vanderbilt)
Vanax ® A: 4,4'-dithiodimorpholine (R. T. Vanderbilt)
Vultac ® 5: alkyl phenol disulfide oligomers (R. T. Vanderbilt)
Durax ®: N-cyclohexyl-2-benzothiazolesulfenamide (R. T. Vanderbilt)

Figure 2:
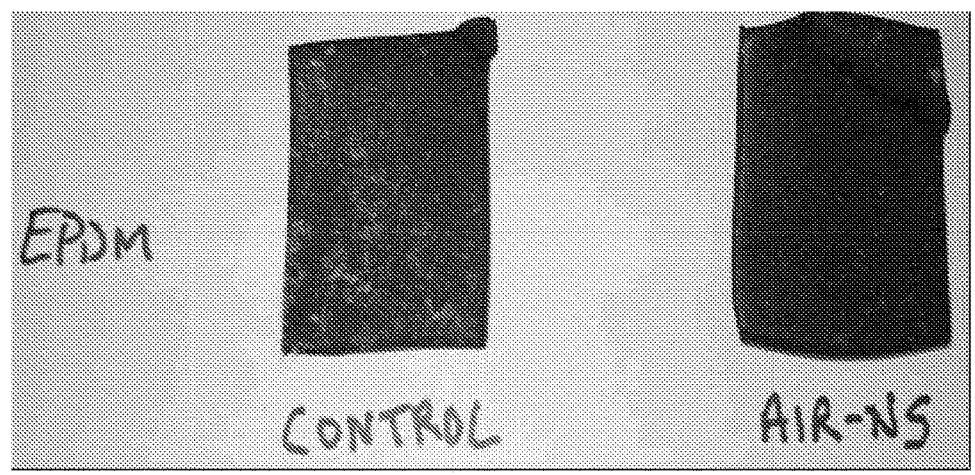
FIG. 2 shows a comparison of two samples of a poly (ethylene propylene diene) elastomer.

The "Control" composition using an EPDM elastomer-peroxide blend provided a very rough surface with many small particles of stuck paper towel, indicating a poor surface cure. The sample cured with the composition of EPDM labeled as "AIR-NS" is smooth with a few traces of paper towel fiber indicating a fairly good surface cure. Pictures of the "Control" and "AIR-NS" samples for Example 2 are shown in FIG. 2.

3. The Blend of 54% EPDM and 46% EPM Elastomers

| Sample Identification: | (phr) Control | (phr) AIR-NS |
|---|---|---|
| EPDM | 54.00 | 54.00 |
| EPM | 46.00 | 46.00 |
| N650 carbon black | 130.42 | 130.42 |
| N990 carbon black | 24.17 | 24.17 |
| Zinc Oxide | 5.00 | 5.00 |
| Stearic Acid | 0.50 | 0.50 |

-continued

| Sample Identification: | (phr) Control | (phr) AIR-NS |
|---|---|---|
| Calcium Carbonate | 55.00 | 55.00 |
| Talc | 20.00 | 20.00 |
| Polyethylene Glycol | 3.00 | 3.00 |
| Calcium Oxide | 5.00 | 5.00 |
| Paraffinic Oil | 86.00 | 86.00 |
| Sartomer ® SR-350 | 3.00 | — |
| Vul-Cup ® 40KE | 6.00 | 6.00 |
| Vanax ® MBM | — | 2.70 |
| Vanax ® A | — | 0.30 |
| Vultac ® 5 | — | 0.91 |
| Durax ® | — | 0.09 |
| Relative Degree of Crosslinking RPA ® DATA at 185° C., 1°arc, 100 cpm | | |
| MH-ML (dN-m) | 14.56 | 15.81 |

Vul-Cup ® 40KE: m/p-di(t-butylperoxy)diisopropylbenzene 40% on Burgess Clay (Arkema Inc.)
Sartomer ® SR-350: trimethylolpropane trimethacrylate (Arkema Inc.)
Vanax ® MBM: meta-N,N'-phenylene bismaleimide (R. T. Vanderbilt)
Vanax ® A: 4,4'-dithiodimorpholine (R. T. Vanderbilt)
Vultac ® 5: alkyl phenol disulfide oligomers (R. T. Vanderbilt)
Durax ®: N-cyclohexyl-2-benzothiazolesulfenamide (R. T. Vanderbilt)

Figure 3:
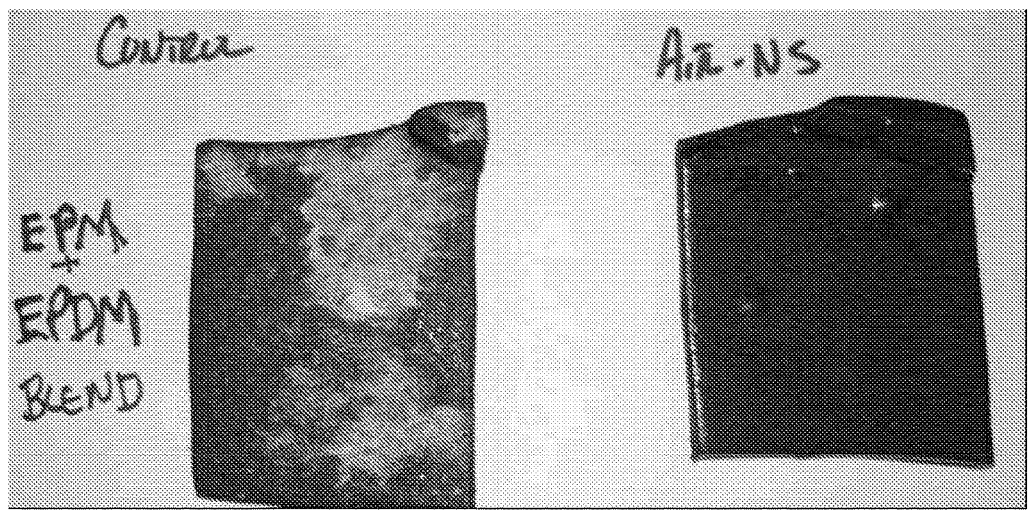
FIG. 3 shows a comparison of two samples of a blend of poly(ethylene propylene) and poly(ethylene propylene diene) elastomers.

FIG. 3 shows the surface cure performance of the peroxide-elastomer blend compositions using a blend of 54% EPDM and 46% EPM, labeled as the "Control". Unlike the #1 EPM and #2 EPDM pictures for the "Control", this #3 "Control" composition provided one of the poorest surfaces cures with considerable paper towel fibers being stuck to a rough, undercured surface.

In contrast, surprisingly, the novel composition of this present invention comprising 54% EPDM and 46% EPM and the components of the invention labeled as "AIR-NS" provided a very shiny surface with no paper towel fibers stuck to the surface, indicating an excellent surface cure.

A few minor trapped air bubbles were present in the uncured sample sheet prior to cure in the hot air oven, which appear as white reflective areas in FIG. 3 (due to the very smooth and shiny surface of the sample). No paper towel fibers were found to adhere to the surface, indicating an excellent and complete cured surface. In summary, the novel peroxide-elastomer composition #3 as taught in this invention which use a novel blend of peroxide, additives, EPM and EPDM elastomers provides an improved cure composition for the hot air cure process, wherein a completely tack-free, fully cured elastomer surface is unexpectedly obtained.

We claim:

1. A process for curing an elastomer composition in the presence of oxygen, the process comprising the steps of:
A) mixing at least one elastomer comprising ethylene-propylene terpolymer, at least one non-elastic co-polymer comprising at least two different monomers in polymerized form, wherein the elastomer and non-elastic co-polymer are present in the elastomer composition at weight ratios from 50:50 to 75:25, and at least one organic peroxide formulation to provide a mixture, wherein the elastomer is saturated or unsaturated, the polymer is saturated or unsaturated, and said polymer does not comprise chlorinated polyethylene or chlorosulfonated polyethylene; and wherein the organic peroxide formulation comprises i) at least one organic peroxide, ii) at least one moiety chosen from bis-, tri- and higher poly-maleimides, and bis-, tri- and higher poly-citraconimides, and iii) at least one sulfur accelerator;
B) curing said mixture in the presence of oxygen.

2. The process of claim 1, wherein the elastomer consists of saturated ethylene-propylene terpolymer.

3. The process of claim 1, wherein the non-elastic co-polymer is unsaturated poly(ethylene propylene).

4. The process of claim 1, wherein the at least one organic peroxide is selected from the group consisting of dialkyl peroxides, diperoxyketals, mono-peroxy carbonates, cyclic ketone peroxides, diacyl peroxides, organosulfonyl peroxides, peroxyesters and peroxydicarbonates.

5. A cured elastomer composition prepared by the process of claim 1.

6. An elastomer composition curable in the presence of oxygen, said composition comprising:
A) at least one elastomer comprising ethylene-prorlene terpolymler which is saturated or unsaturated;
B) at least one non-elastic co-polymer comprising at least two different monomers in polymerized form and which is saturated or unsaturated;
C) at least one organic peroxide;
D) at least one compound chosen from bis-, tri- and higher poly-maleimides, and bis-, tri- and higher poly-citraconimides; and
E) at least one sulfur accelerator;
wherein said at least one polymer does not comprise chlorinated polyethylene or chlorosulfonated polyethylene;
wherein elastomer and non-elastic co-polymer are present in the elastomer composition at weight ratios from 50:50 to 75:25;
such that said elastomer composition crosslinks in the presence of oxygen.

7. The composition of claim 6, wherein the at least one organic peroxide is selected from dialkyl peroxides, diperoxyketals, mono-peroxy carbonates, cyclic ketone peroxides, diacyl peroxides, organosulfonyl peroxides, peroxyesters and peroxydicarbonates.

8. The composition of claim 6, wherein the elastomer consists of saturated ethylene-propylene terpolymer and the at least one non-elastic co-polymer is unsaturated poly (ethylene propylene).

9. A method for manufacturing an article comprising an elastomer composition curable in the presence of oxygen, said elastomer composition comprising:
A) at least one elastomer comprising ethylene-propylene terpolymer;
B) at least one non-elastic co-polymer comprising unsaturated poly(ethylene propylene);
C) at least one organic peroxide;
D) at least one compound chosen from bis-, tri- and higher poly-maleimides, bis-, tri- and higher poly-citraconimides, and p-phenylenediamine based antiozonants; and
E) at least one sulfur accelerator;
wherein said at least one polymer does not comprise chlorinated polyethylene or chlorosulfonated polyethylene;
wherein the elastomer and non-elastic co-polymer are present in the elastomer composition at weight ratios from 50:50 to 75:25;
such that said elastomer composition crosslinks in the presence of oxygen;
said method comprising the steps of:
extruding said elastomer composition in the presence of hot air to form an uncured preform article;
curing said uncured preform article.

10. The method of claim 9, wherein curing said extruded preform comprises curing using microwaves or a steam autoclave.

11. The method of claim 9, wherein extruding and curing the elastomer composition are performed continuously.

12. The method of claim 9, wherein extruding and curing the elastomer composition are performed continuously in a hot air tunnel.

13. The method of claim 9, wherein said article is a seal, hose, or gaskets.

14. A method for manufacturing an article comprising an elastomer composition curable in the presence of oxygen, said elastomer composition comprising:
  A) at least one elastomer comprising ethylene-propylene terpolymer which is saturated or unsaturated:
  B) at least one non-elastic co-polymer comprising at least two different monomers in polymerized form and which is saturated or unsaturated;
  C) at least one organic peroxide;
  D) at least one compound chosen from bis-, tri- and higher poly-maleimides, and bis-, tri- and higher poly-citraconimides; and
  E) at least one sulfur accelerator;
  wherein said at least one polymer does not comprise chlorinated polyethylene or chlorosulfonated polyethylene;
  wherein the elastomer and non-elastic co-polymer are present in the elastomer composition at weight ratios from 50:50 to 75:25;
  such that said elastomer composition crosslinks in the presence of oxygen,
said method comprising the steps of:
  injecting molding, compression molding or transfer molding the elastomer composition.

15. A process for reducing mold-fouling in the presence of oxygen during the manufacture of elastomer articles, comprising:
  A) supplying an uncured elastomer composition to a mold, wherein the uncured elastomer composition comprises saturated ethylene-propylene terpolymer, at least one non-elastic unsaturated co-polymer which is poly(ethylene propylene), wherein the elastomer and non-elastic co-polymer are present in the elastomer at weight ratios from 50:50 to 75:25 at least one organic peroxide formulation, wherein said at least one organic peroxide formulation comprises i) at least one organic peroxide, ii) at least one moiety chosen from bis-, tri- and higher poly-maleimides, bis-, tri- and higher poly-citraconimides, and p-phenylenediamine based antiozonants, and iii) at least one sulfur accelerator;
  B) curing the elastomer composition to form an elastomer article; and
  C) releasing the cured elastomer article from the mold.

16. The process of claim 15, wherein the at least one organic peroxide is selected from the group consisting of dialkyl peroxides, diperoxyketals, mono-peroxy carbonates, cyclic ketone peroxides, diacyl peroxides, organosulfonyl peroxides, peroxyesters and peroxydicarbonates.

17. The process of claim 1, wherein the elastomer consists of saturated ethylene-propylene terpolymer, the non-elastic co-polymer is unsaturated poly(ethylene propylene), and the moiety is chosen from bis-, tri- and higher poly-maleimides, and bis-, tri- and higher poly-citraconimides.

* * * * *